Jan. 21, 1964     H. FISCHER     3,118,525
ONE-WAY DEVICE

Filed Oct. 28, 1960     2 Sheets-Sheet 1

INVENTOR.
Harold Fischer
BY Hugh L. Fisher
ATTORNEY

Jan. 21, 1964     H. FISCHER     3,118,525
ONE-WAY DEVICE

Filed Oct. 28, 1960     2 Sheets-Sheet 2

INVENTOR.
Harold Fischer
BY Hugh L. Fisher
ATTORNEY

United States Patent Office 3,118,525
Patented Jan. 21, 1964

3,118,525
ONE-WAY DEVICE
Harold Fischer, Flint, Mich., assignor to General Motors Corporation, Detroit, Mich., a corporation of Delaware
Filed Oct. 28, 1960, Ser. No. 65,759
1 Claim. (Cl. 192—45)

This invention relates to improvements in one-way devices either for use as unidirectional clutches or brakes.

Assembly always presents a problem in one-way devices primarily because they each generally have numerous small parts such as wedging and biasing elements. Consequently, a device can, during transportation from one place to another, become disassembled; or, during installation, parts can drop out of the assemblage. This, of course, results in lost time and certainly is not acceptable for volume production.

With the foregoing in mind, the invention contemplates a novel one-way device particularly suited for partial assembly as a sub-unit prior to installation within the final assemblage, and furthermore that is adapted for manufacture according to accepted mass production techniques. By the invention, a unique cage structure and biasing element arrangement maintains individual wedging elements within an enclosure defined by the cage structure and one of the races so that there is no concern for possible separation of parts prior to the installation of the other race. The cage structure in accordance with the invention has provision for supporting each biasing element, and each biasing element in turn is formed, as a further feature of this invention, in such a way that the biasing element urges the associated wedging element against a part of the cage structure thereby insuring that the biasing elements and the wedging elements cannot drop out of the assemblage.

Also, the cage structure solves another problem in that the construction thereof according to the invention permits the formation of the cage so as to correspond to the contour of the race with which it coacts in entrapping the wedging devices so as to restrict relative movement therebetween. In this way, the problem of alignment of the wedging devices with the cage and the cam race is overcome since relative rotation between the cage structure and the cam race is restricted to an extent that insures proper maintenance of the alignment.

During operation of a one-way device incorporating one or more wedging elements, occasions occur when the wedging element does not securely lock in the wedging position so that the load thereon causes the wedging element to be forcibly ejected. This so-called "pop-out" of the wedging elements compresses the biasing element and dependent on its configuration, e.g., the bias element may be an accordion type spring, can produce breakage. If not broken, usually the biasing element is overstressed to the point where it never recovers its resiliency so that thereafter, the device will commence to malfunction. To overcome this problem, the invention affords the foregoing cage structure with a provision for restricting the extent that a biasing element can be compressed should "pop-out" occur.

The foregoing and other objects and advantages of the invention will be apparent from the following description and from the accompanying drawings, in which.

Figure 1:
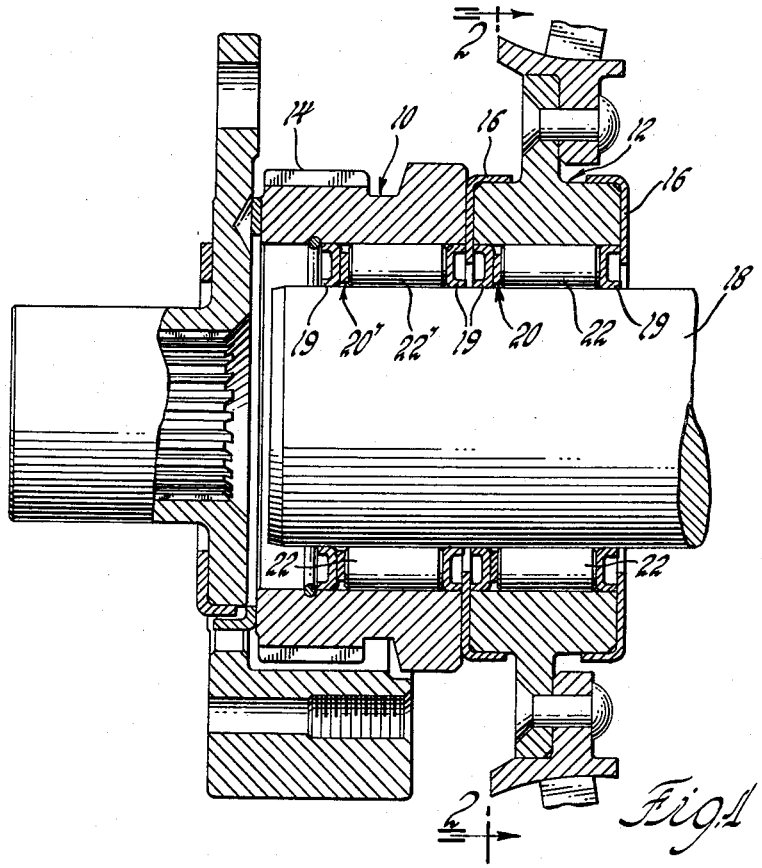
FIGURE 1 is a sectional view of an installation of plural one-way devices each incorporating the principles of the invention.

Referring first to FIGURE 1, two one-way devices designated generally at 10 and 12 are displayed and may be employed either as unidirectional clutches or brakes. If used as clutches, input may be to outer races 14 and 16, respectively, for devices 10 and 12. Then, assuming the rotation of the input is in the locking direction, drive may be transferred to an inner race 18, which performs as an output. Or, if preferred, and the installation permits, the inner race 18 may become the input, and the outer races 14 and 16, the output. Keeping in mind that as is well-known with a unidirectional clutch, drive between the input and output is permitted only in one direction. If rotation is not in this direction, then the clutches will unlock so that no drive is transferred to the output.

If, on the other hand, the devices 10 and 12 are to perform as unidirectional brakes, the outer races 14 and 16 may be grounded so as to permit rotation of the inner race 18 only in a selected direction. Or, the inner race 18 may be suitably braked and prevent rotation of the outer races 14 and 16 in the locking direction.

The structure of the devices 10 and 12, as will become apparent, renders them particularly suited for the FIGURE 1 arrangement wherein two of the devices may be positioned side by side with their relative axial positions maintained by appropriate spacers 19. The positioning of the devices 10 and 12, of course, can be maintained in any other known way. In this arrangement, one of the devices can perform as a brake and another as a clutch, or both can perform as clutches with one locking in one direction and the other locking in the opposite direction. Similarly, one can brake in one direction and the other brake in the opposite direction.

Since the two one-way devices 10 and 12 are identical in construction and function, only the device 12, as viewed in FIGURE 2, will be described. Corresponding parts of the device 10 have the same numerals as device 12 except that a prime has been added to the number.

Figure 2:
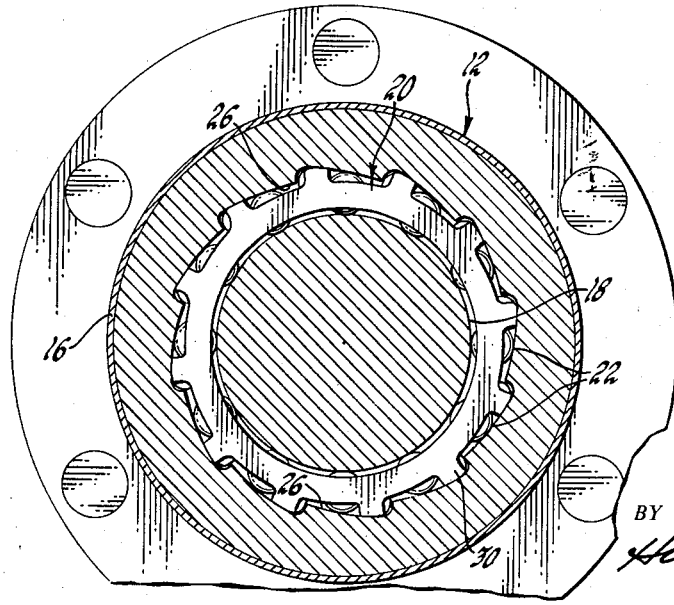
FIGURE 2 is a sectional view of one of the devices taken along line 2—2 of FIGURE 1.
Figure 5:
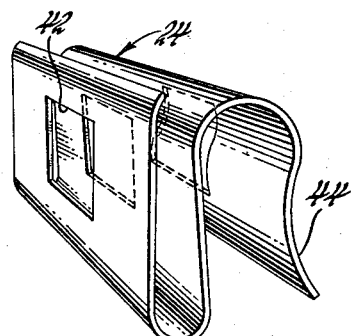
FIGURE 5 is a perspective view of a biasing element employed by the device.

As depicted in FIGURE 2, there is a cage 20 interposed between the outer and inner races 16 and 18 that positions a series of wedging elements, as rollers 22, and also supports biasing elements, in this embodiment accordion shaped springs 24 of the general configuration shown in FIGURE 5. The outer race 16 in this installation is provided with a series of cam surfaces 26 each of which is separated from the adjacent cam surface by an abutment surface 28, the formation of which can take place at the time the cam surfaces 26 are generated, this being, for instance, by the process commonly known as broaching. Other ways will be apparent to those skilled in this art.

With the FIGURE 2 construction, the device 12 will lock if the inner race 18 attempts to revolve clockwise while the outer race 16 is either held or revolved counterclockwise. If the outer race 16 should be the output, the clockwise rotation of the inner race 18 will, due to the locking of the device, cause the outer race 16 to be revolved therewith at the same speed and of course in the same sense.

Figure 3:
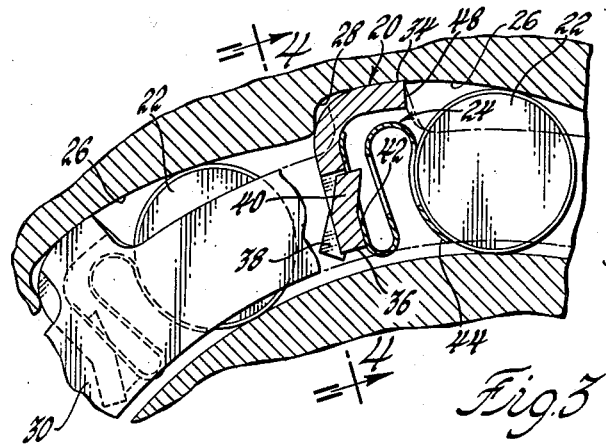
FIGURE 3 is an enlarged fragmentary view of a portion of FIGURE 2.
Figure 3A:
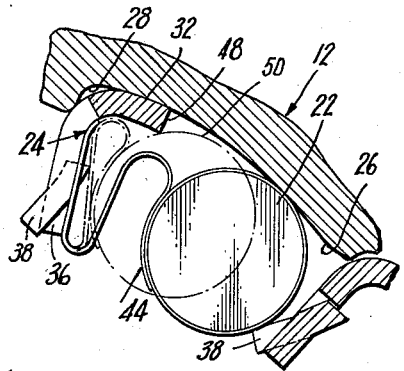
FIGURE 3a is an enlarged fragmentary view of a portion of FIGURE 2 illustrating a sub-assembly of the device of FIGURE 2.

The cage 20, best seen in FIGURES 2, 3 and 3a, includes an annular radially extending flange 30 from which a series of arms 32 laterally extend. The disposition of the arms 32 relative to each other provides the mentioned openings for reception of the rollers 22. Each of the arms 32 further includes a circumferentially extending portion 34 of a configuration that conforms to and engages both the cam and abutment surfaces 26 and 20 in the vicinity of the abutment surface 28 so as to prevent relative rotation between the outer race 16 and the cage 20. This cage structure not only accurately positions the cage 20 but facilitates the alignment of each of the rollers 20 relative to their respective cam surface 26. Proper alignment is essential to an efficient device since if each roller 20 is continuously prepared to assume its proportionate share of the load, there is less tendency for malfunctions to occur due to, e.g., overloading of some rollers or cocking.

Another aspect of the cage structure is that the portions 34 utilize surfaces that are inherently available on the outer race 16 and a surface that, as mentioned, is easily generated. Moreover, the configuration of the portions 34 can easily be stamped during fabrication of the cage 20.

Figure 4:
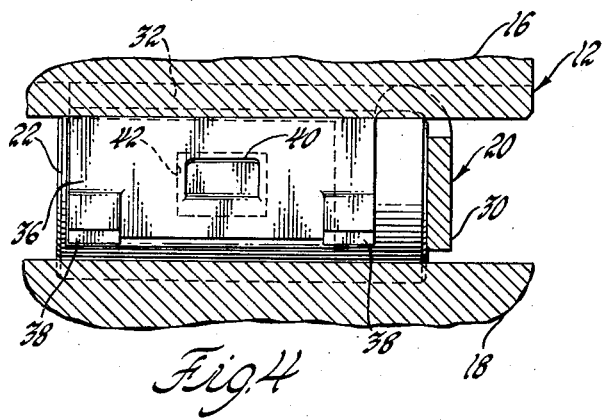
FIGURE 4 is a fragmentary sectional view of the device taken along line 4—4 of FIGURE 3.

The arms 32 also have radially depending portions 36, each of which have notched-out sections as can be observed in FIGURES 3 and 4 so as to provide end tabs 38 extending in one direction and an intermediate tab 40 extending in the opposite direction. The tab 40 serves as a support for the spring 24, which has a window 42 therein of the same general shape. In addition to the support of the spring 24, the axial disposition thereof is also maintained, and hence, the spring 24 cannot shift sidewise, nor drop downwardly away from the cage 20 during assembly.

The tabs 38 along with the spring 24 and outer race 16 afford a sub-assembly as shown in FIGURE 3a in which the rollers 22 are urged into engagement with the tabs 38, this position being displayed in FIGURE 3a. As can be seen, the tabs 38 provide somewhat of a platform or support shelf against which the rollers 22 abut. Additionally, the rollers 22 at the opposite side are precluded from dropping downwardly from the assemblage by the flared end 44 formed on the spring 24. This flared end 44 has the same general contour as the rollers 22 and embraces the downward part of the roller 22 to an extent that in the position 46 the rollers 22 cannot fall downwardly but actually are urged against both the tabs 38 and the cam surface 26 so as to be entrapped therebetween. The springs 24 still serve their function of urging the rollers 22 to the solid line wedging position viewed.

Actually, the assembly sequence can be varied but one way is to insert the cage 20 into position within the outer race 16 and then the springs 24 may be placed on the tabs 40. Thereafter, the rollers 22 may be inserted so as to assume the position shown in FIGURE 3a. This sub-assembly will not separate and can be transported without concern to the station where the inner race 18 is to be installed.

The cage 20 serves another function, that being to protect the springs 24 against damage should the cooperating roller 22 be forcibly ejected from the wedging position. This "pop-out," should it occur, cannot compress the springs 24 any further than permitted by a stop 48 furnished at the edge of the circumferentially extending portion 34 of the arm 32. As depicted in FIGURE 3a, the roller 22 can assume the broken line position shown at 50 in which the spring 24 will not be compressed sufficiently to either exceed a safe stress or produce breakage.

Of course, the extent of compression of the spring 24 will be determined by the spring itself and the use of the device 12.

Figure 6:
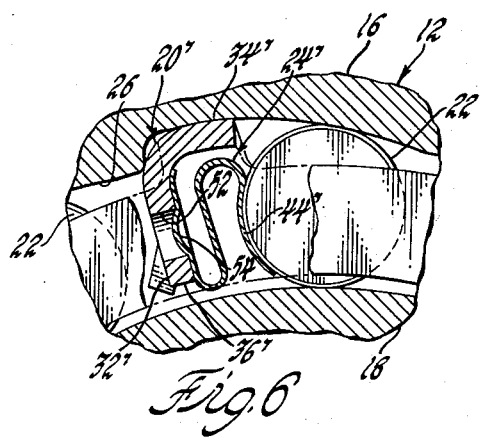
FIGURES 6 and 7 are views similar, respectively, to FIGURES 3 and 5 of an alternative construction.
Figure 7:
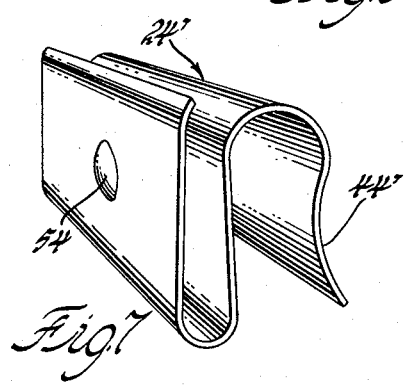

FIGURES 6 and 7 show a modified cage 20' incorporating, instead of the intermediate tab 40, an aperture 52 at the radially depending portion 36' of the cage arm 32'. A depression 54 is formed in the spring 24', which depression 54 will fit within the aperture 52 as seen in FIGURE 6 so as to maintain the position of the springs 24' relative to the cage 20' in much the same way as with the FIGURE 4 structure.

To summarize the several desirable features of the cage 20, it can now be seen that the cage 20 (1) accurately aligns the rollers 22 with their corresponding cam surfaces 26; (2) has only the limited relative movement, if any, with respect to the outer race 16; (3) retains and accurately positions springs 24; (4) affords a support shelf against which the rollers 22 may be urged so as to afford a sub-assembly including the rollers 22, the springs 24, the cage 20, and the outer race 16; and (5) prevents damage to the spring 24 should "pop-out" occur.

The invention is to be limited only by the following claim.

I claim:

In a one-way device sub-assembly, the combination of a race having a series of spaced cam surfaces formed thereon, a cage including circumferentially spaced cage portions having the same general contour as the cam surfaces and engageable therewith so as to prevent relative movement therebetween, said cage further including a plurality of circumferentially spaced side arms forming openings therebetween, a wedging element and a bias element positioned within each opening, said side arms including angularly disposed notched out tabs oppositely extending laterally therefrom, one of said tabs engaging and supporting one end of said bias element to prevent said bias element from shifting outwardly with respect to said cage, and the other of said tabs being engaged by said wedging element and providing a stop member therefor, said bias element having a flared end engaging said wedging element so as to urge said wedging element into engagement with said cam surface and said other of said tabs thereby retaining said wedging element in position within said sub-assembly.

References Cited in the file of this patent

UNITED STATES PATENTS

| | | |
|---|---|---|
| 1,820,151 | Mullen | Aug. 25, 1931 |
| 2,371,653 | Schuckers | Mar. 20, 1945 |
| 2,843,238 | Rozner | July 15, 1958 |
| 2,973,847 | Stockton | Mar. 7, 1961 |
| 3,011,606 | Ferris et al. | Dec. 5, 1961 |
| 3,031,052 | Blinder | Apr. 24, 1962 |
| 3,031,053 | Sauzedde et al. | Apr. 24, 1962 |